Patented Jan. 5, 1954

2,665,311

UNITED STATES PATENT OFFICE 2,665,311

PREPARATION OF ACETYLENIC AMINES

Charles H. McKeever, Glenside, and Marian F. Fegley, Mont Clare, Pa., assignors to Rohm & Haas Company, Philadelphia, Pa., a corporation of Delaware No Drawing. Application September 23, 1950, Serial No. 186,494

8 Claims. (Cl. 260—583)

This invention relates to the preparation of acetylenic amines. More particularly it relates to the preparation of acetylenic amines having the general formula $$RNHCHC\equiv CH$$
$$|$$
$$R'$$

in which R and R' are alkyl groups containing one to nine carbon atoms.

These acetylenic amines are made by reacting acetylene under anhydrous conditions with an aldimine having the general formula $$RN=CHR'$$

in which R and R' are alkyl groups. The chemical reaction, which is carried out in the presence of cuprous chloride as a catalyst, proceeds as follows:

$$RN=CHR' + CH\equiv CH \longrightarrow RNHCHC\equiv CH$$
$$|$$
$$R'$$

The alkyl groups which are represented by R and R' can be straight chains or branched chains typified by the following: Methyl, ethyl, propyl, isopropyl, n-butyl, isobutyl, tert.-butyl, hexyl, 2-ethylhexyl, isononyl, n-nonyl, 3,5,5-trimethylpentyl, 1,1,3,3-tetramethylbutyl groups and the isomeric alkyl groups thereof. It will be noted that the alkyl groups, which are represented by R and R', remain intact throughout the process and that the reaction takes place by addition of the acetylene to the carbon atom adjacent to R'. The reaction, therefore, is not dependent upon the particular groups which are represented by R and R'. Aldimines in which R represents a tertiary-alkyl group are particularly reactive.

Superatmospheric pressures are employed and, while the pressure can be as great as the equipment will tolerate and while the rate of reaction is greater at higher pressures, the pressure need not be inconveniently high. Very successful results have been obtained at 5 to 50 pounds' pressure. The reaction need not be carried out in solvent but the presence of a solvent is recommended. It has also been found advantageous to add small portions of catalyst as the reaction progresses rather than to employ all of the catalyst at the outset.

Temperatures from 0° C. to 100° C. can be employed. At the lower temperatures the rate of reaction is of course slower and at the higher temperatures the tendency towards polymerization is greater. Accordingly, a temperature from 20° C. to 60° C. is much preferred. The course of the reaction is best followed by a measurement of the rate of absorption of the acetylene which is rapid at first but which decelerates as the reaction progresses. Also, there is a tendency on the part of some aldimines to form bis-compounds having the general formula $$RNHCHC\equiv CCHNHR$$
$$|\qquad\qquad |$$
$$R'\qquad\quad R'$$

if the time of reaction is extended or the temperature is high.

The process comprises reacting acetylene with an aldimine of the formula RN=CHR' under superatmospheric pressure at a temperature from 0° C. to 100° C. and under anhydrous conditions in the presence of a cuprous chloride catalyst and thereafter removing the catalyst and separating the acetylenic amine, preferably by fractional distillation. The following examples will serve to illustrate the procedure. The yields which are set forth are based on the aldimine which is consumed. When based on the acetylene consumed, the yields are much higher.

Example 1

A 500-cc., 3-necked flask, equipped with stirrer, thermometer, a sintered glass gas-dispersion tube, and a gas outlet tube, was charged with 90 grams (0.7 mole) of distilled butylidine-t-butyl-amine, $$\begin{array}{c}CH_3\\|\\CH_3-C-N=CHCH_2CH_2CH_3,\\|\\CH_3\end{array}$$

together with 80 grams of dry dioxane and 6 grams of powdered cuprous chloride. All stoppers and connections were wired tight and acetylene was charged to a pressure of 5 lbs./sq. in. After nine hours at room temperature 6.5 grams of acetylene had been absorbed. The reaction mixture was then warmed to 45° C. and the addition of acetylene was continued for 18 hours at this temperature. A total of 13.5 grams (0.52 mole) of acetylene was absorbed. During the reaction a total of seven additional grams of cuprous chloride was added in three equal portions at approximately six-hour intervals. The reaction mixture was first filtered to remove the catalyst and then stripped of dioxane. The resultant mixture was then fractionally distilled under reduced pressure and a total of 69 grams of 3-t-butylamino-1-hexyne was obtained. This represented a 64.5% yield based on the aldimine. This product which has the formula $$\begin{array}{c}CH_3\\|\\CH_3-C-NH-CHC\equiv CH\\|\qquad\qquad|\\CH_3\qquad CH_2CH_2CH_3\end{array}$$

as confirmed by analysis, boiled at 58°–60° C./14 mm. (Hg) and had an index of refraction of $n_D^{21}$ 1.4323.

*Example 2*

The same general procedure as described in Example 1 was followed in the preparation of other acetylenic amines. Thus, 0.95 mole of aldimine

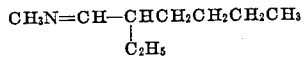

was reacted with 0.48 mole of acetylene in the presence of a total of 12 grams of cuprous chloride at an initial temperature of 20° C. for seven hours and then at 49°–53° C. for 31 hours while dissolved in 100 grams of dry dioxane. The product was an acetylenic amine of the formula

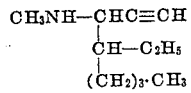

which boiled at 64°–66° C./5 mm. and had an index of refraction of $n_D^{21}$ 1.4475. Its composition was confirmed by analysis ($N_2$=8.3%; calc. 8.37%) and the yield was 28% based on the aldimine.

*Example 3*

A 23% yield of

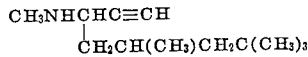

was obtained according to the procedure of Example 1 above by reacting 0.35 mole of

with 0.27 mole of acetylene, while dissolved in 100 cc. of dioxane, over a period of 13 hours at room temperature in the presence of a total of 6.5 grams of cuprous chloride. The product boiled at 75° C./4.8 mm. and had an index of refraction of $n_D^{20}$ 1.4453.

*Example 4*

In a similar manner a 55% yield was obtained of an acetylenic amine having the formula

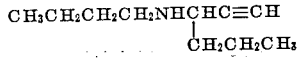

by reacting 0.88 mole of the aldimine

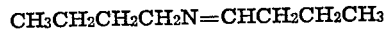

with 0.60 mole of acetylene while dissolved in 100 cc. of dioxane over a period of ten hours at room temperature and ten hours at 45° C. in the presence of a total of 10 grams of cuprous chloride. The product boiled at 89° C./22 mm. and had an index of refraction of $n_D^{20}$ 1.4388. It analyzed 9.1% nitrogen as against a calculated value of 9.13%.

*Example 5*

When 0.47 mole of the aldimine

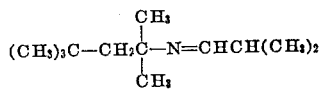

was reacted with 0.48 mole of acetylene for 21 hours at room temperature and then seven hours at 60° C. in the presence of a total of 10 grams of cuprous chloride while dissolved in 85 grams of dioxane, a 71% yield was obtained of the acetylenic amine having the formula

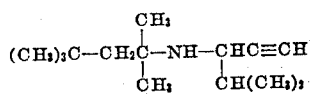

This compound boiled at 56°–57° C./1 mm. and had an index of refraction of $n_D^{20}$ 1.4487. Its composition was confirmed by analysis (nitrogen found=6.63%; calculated=6.69%).

*Example 6*

When the procedure of Example 1 was followed, there was obtained a 59% yield of an acetylenic amine of the formula

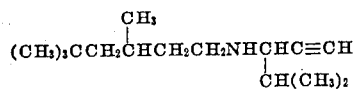

by the reaction of 0.76 mole of the aldimine

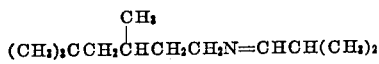

with 0.55 mole of acetylene in the presence of 8 grams of cuprous chloride and 60 grams of dioxane over a period of two hours at room temperature and 16 hours at 50°–64° C. The product boiled at 60°–61° C./0.18 mm. and had an index of refraction of 1.4463.

While dioxane was employed in all of the above examples, because it is a particularly suitable solvent, other solvents such as acetone, acetonitrile, diethyl ether, dimethylformamide, and tetrahydrofuran can be likewise employed.

We claim:

1. A process for preparing an acetylenic amine having the formula

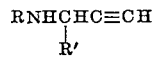

wherein R and R' are alkyl groups of one to nine carbon atoms which comprises reacting acetylene with an aldimine having the formula RN=CHR', wherein R and R' are identical with the same characters above, under anhydrous conditions, under superatmospheric pressure, at a temperature from 0° to 100° C. and in the presence of cuprous chloride as a catalyst and thereafter separating said acetylenic amine.

2. A process for preparing an acetylenic amine having the formula

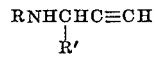

wherein R and R' are alkyl groups of one to nine carbon atoms which comprises reacting acetylene with an aldimine having the formula RN=CHR', wherein R and R' are identical with the same characters above, under anhydrous conditions, under a pressure of 5 to 50 pounds per square inch at a temperature from 20° to 60° C. and in the presence of cuprous chloride as a catalyst and thereafter separating said acetylenic amine.

3. A process for preparing an acetylenic amine having the formula

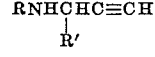

wherein R and R' are alkyl groups of one to nine carbon atoms which comprises preparing a mixture of acetylene, an aldimine having the formula RN=CHR', wherein R and R' are identical with the same characters above, and cuprous chloride under a pressure of 5 to 50 pounds per square inch and under anhydrous conditions, then heating the mixture to a temperature up to 100° C. and thereafter separating said acetylenic amine from the mixture.

4. A process of preparing an acetylenic amine of the formula

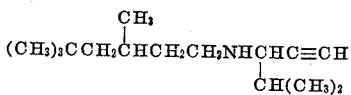

which comprises reacting acetylene with an aldimine having the formula

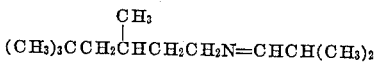

under superatmospheric pressure and anhydrous conditions at a temperature from 20° to 60° C. in the presence of cuprous chloride as a catalyst and thereafter separating said acetylenic amine.

5. A process of preparing an acetylenic amine of the formula

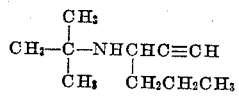

which comprises reacting acetylene with an aldimine having the formula

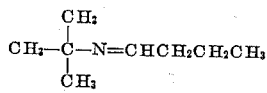

under superatmospheric pressure and anhydrous conditions at a temperature from 20° to 60° C. in the presence of cuprous chloride as a catalyst and thereafter separating said acetylenic amine.

6. A process of preparing an acetylenic amine of the formula

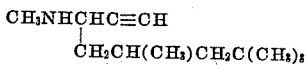

which comprises reacting acetylene with an aldimine having the formula

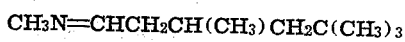

under superatmospheric pressure and anhydrous conditions at a temperature from 20° to 60° C. in the presence of cuprous chloride as a catalyst and thereafter separating said acetylenic amine.

7. A process of preparing an acetylenic amine of the formula

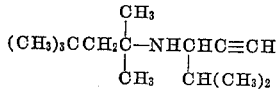

which comprises reacting acetylene with an aldimine having the formula

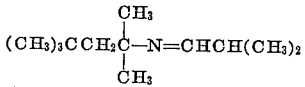

under superatmospheric pressure and anhydrous conditions at a temperature from 20° to 60° C. in the presence of cuprous chloride as a catalyst and thereafter separating said acetylenic amine.

8. A process of preparing an acetylenic amine of the formula

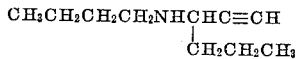

which comprises reacting acetylene with an aldimine having the formula

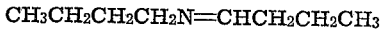

under superatmospheric pressure and anhydrous conditions at a temperature from 20° to 60° C. in the presence of cuprous chloride as a catalyst and thereafter separating said acetylenic amine.

CHARLES H. McKEEVER.
MARIAN F. FEGLEY.

References Cited in the file of this patent

FOREIGN PATENTS

| Number | Country | Date |
| --- | --- | --- |
| 510,904 | Great Britain | Aug. 10, 1939 |

OTHER REFERENCES

Degering: "An Outline of Organ. Nitrogen Cpds." (1945), p. 203.